United States Patent [19]

Chitayat

[11] Patent Number: 4,484,854
[45] Date of Patent: Nov. 27, 1984

[54] ROBOTIC HEIGHT SENSOR IN LATERALLY COMPLIANT PROBE

[75] Inventor: Anwar Chitayat, Northport, N.Y.

[73] Assignee: Anorad Corporation, Hauppauge, N.Y.

[21] Appl. No.: 408,169

[22] Filed: Aug. 16, 1982

[51] Int. Cl.³ ............................ B25J 7/00; B25J 19/00
[52] U.S. Cl. ........................................ 414/730; 414/5; 250/561; 901/33; 901/45; 356/373
[58] Field of Search ................ 414/5, 730, 753, 754; 356/373, 375; 250/577, 561; 73/DIG. 11; 901/32, 33, 45

[56] References Cited

U.S. PATENT DOCUMENTS

| | | | |
|---|---|---|---|
| 3,007,097 | 10/1961 | Shelley et al. | 414/753 X |
| 3,847,485 | 11/1974 | Zanoni | 356/375 |
| 3,867,037 | 2/1975 | Litke | 356/373 |
| 3,888,362 | 6/1975 | Fletcher et al. | 414/730 X |
| 3,986,007 | 10/1976 | Ruoff, Jr. | 414/730 X |
| 4,001,556 | 1/1977 | Folchi et al. | 414/5 X |
| 4,028,935 | 6/1977 | Philbert et al. | 356/373 X |
| 4,049,644 | 9/1977 | Wennerstrom | 356/373 X |

FOREIGN PATENT DOCUMENTS 8714 3/1980 European Pat. Off. ............ 414/754

Primary Examiner—Joseph E. Valenza
Assistant Examiner—Terrance L. Siemens
Attorney, Agent, or Firm—Thomas R. Morrison

[57] ABSTRACT

A robotic height sensor employs the defocussing of a spot of light to detect the motion of a probe contacting a reference object. The defocussing changes the electrical output of a photodetector which output is used to control a height drive mechanism. In a preferred embodiment of the invention, an intentional weakened portion of a shaft is provided for permitting limited lateral freedom of the shaft to accommodate minor irregularities in a workpiece.

3 Claims, 6 Drawing Figures

ROBOTIC HEIGHT SENSOR IN LATERALLY COMPLIANT PROBE

BACKGROUND OF THE INVENTION

The present invention is related to robotics and, more particularly, is related to sensing contact between an affector and an external object.

Robotic devices are regularly appearing in manufacturing operations where advantage can be taken of the improved precision and cost benefits from their use. In many robotic applications, an affector such as a tool is positioned in two dimensions with respect to a workpiece and then the affector is moved on a third axis into working relationship with the workpiece. Where the third axis dimension is either variable or contains errors, it has been difficult to determine the point at which travel in the third axis should cease.

Tactile sensing (a sense of touch) has been proposed for robotic devices, but the problems of accomplishing such sensing have not been satisfactorily solved.

OBJECTS AND SUMMARY OF THE INVENTION

Accordingly, it is an object of the invention to provide a robotic sensing apparatus which is capable of accommodating varying workpiece dimensions.

It is a further object of the invention to provide a robotic affector having lateral compliance for accommodating misalignment between the affector and a workpiece.

It is a further object of the invention to provide a robotic height sensor employing the defocussing of a spot of light to detect height.

It is a further object of the invention to provide a robotic height sensor in which a spot of light is focussed on a conical collar movable by contact with a workpiece and a detector sensitive to light reflected from the conical collar. The cone angle of the conical collar determines the relationship between the distance the conical collar is moved and the change in detector output.

According to an aspect of the present invention, there is provided an apparatus for detecting displacement of a part, comprising a diffuse reflecting surface on the part, means for producing a spot of light on the surface, a photodetector effective to produce a signal in response to the spot of light, and the signal being variable in relation to a distance between the surface and the photodetector whereby the signal is usable for detecting displacement of the part.

According to a further aspect of the present invention, there is provided a robotic device having position control in at least one axis, comprising a control head, an affector extending from the control head parallel to the axis, means for permitting displacement of the affector along the axis with respect to the control head in response to contact between the affector and an external object, a diffusely reflective surface at an angle to the axis and movable with the affector, an optical reflective sensor in the control head, and the optical reflective sensor being effective to focus a spot of light on the surface and to detect the spot of light to produce a signal in response thereto, the signal being variable with a distance between the optical reflective sensor and the surface whereby the signal is related to the displacement.

According to a feature of the present invention, there is provided a method of controlling height of a robotic member with respect to a workpiece, comprising moving an affector on the robotic member along an axis toward the workpiece, permitting the affector to displace along the axis with respect to the robotic member in response to contact between the affector and the workpiece, focussing a spot of light on a diffusely reflective surface movable with the affector, detecting the spot of light to produce a signal, positioning the surface to produce a substantially smooth change in the signal in response to a change in displacement of the affector, and stopping motion of the robotic member when the signal attains a predetermined value.

According to a further feature of the present invention, there is provided an apparatus for permitting limited lateral freedom of a shaft, comprising a reduced diameter portion of the shaft forming an intentionally weakened region, a first end of the reduced diameter portion being rigidly secured against lateral motion, a second end of the reduced diameter portion being joined to a larger diameter portion having a diameter large enough to be substantially resistant to bending, and a plurality of resilient members encircling the larger diameter portion and effective to retain the shaft in a centered position in the absence of transverse force on the shaft but permitting limited transverse motion in the presence of a transverse force, the reduced diameter portion deflecting sufficiently to allow the limited transverse motion, the maximum deflection being below a value which causes permanent strain on the reduced diameter portion whereby the shaft is returned to the centered position when the transverse force is removed.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
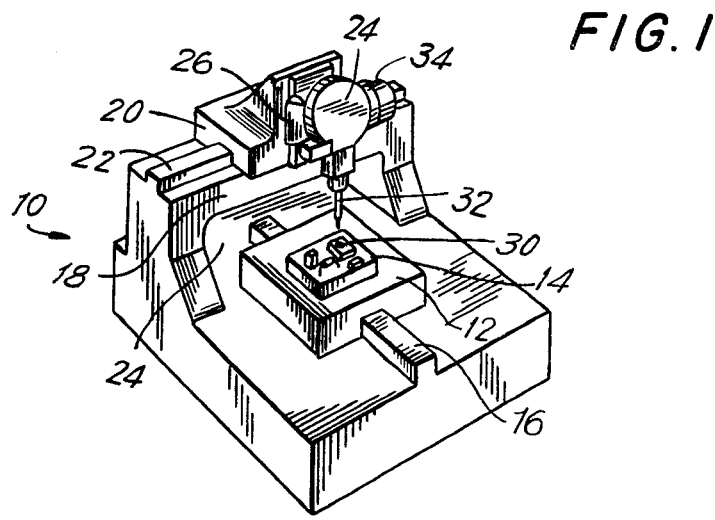
FIG. 1 is a perspective view of a robotic apparatus which may employ the present invention.

Referring now to FIG. 1, there is shown, generally at 10, one form of robotic device employing an embodiment of the invention. As is well known, robotic devices come in many forms including manipulator arms having several degrees of angular freedom, and mobile devices with manipulators. The present invention has general applicability to all such robotic devices but, for concreteness of description, a single type of device employed in a linear XYZ control system is illustrated.

A table 12 upon which a workpiece 14 is mounted is supported by means well known in the art and guided for travel along an axis arbitrarily identified as the Y axis by a guide bar 16.

A bridge 18 supports a second table 20 which is guided in a horizontal direction orthogonal to the Y axis by a guide bar 22. Bridge 18 provides a space 24 permitting table 12 to pass thereunder.

A Z-axis actuator 26 controls vertical travel of a control head 28 toward and away from workpiece 14. It would be clear to one skilled in the art that, by properly controlling the motion of tables 12 and 20, control head 28 can be positioned at any horizontal position relative to workpiece 14.

In a specific example for purposes of illustration, it is assumed that workpiece 14 is an electronic circuit having, for example, coils 30 which must be adjusted by robotic device 10 in, for example, final manufacturing adjustment. A tuning wand 32, extending downward from control head 23, may be positioned over, and descended into contact with an adjustable element of coil 30. Although not shown, it would be understood that an appropriate output of the electronic circuit in workpiece 14 would be monitored while tuning wand 32 is manipulated so that the appropriate adjustment is performed. Such monitoring is conventional and will not be further described.

Although only a single tuning wand 32 is shown extending from control head 28, it would be clear that control head 28 may have two or more manipulating devices extending therefrom and may be rotatable about a horizontal axis, for example, to bring different ones of the implements into use as the need arises. A motor 34 which may be integral with control head 28 is controlled by the sensing circuits to manipulate tuning wand 32.

Figure 2:
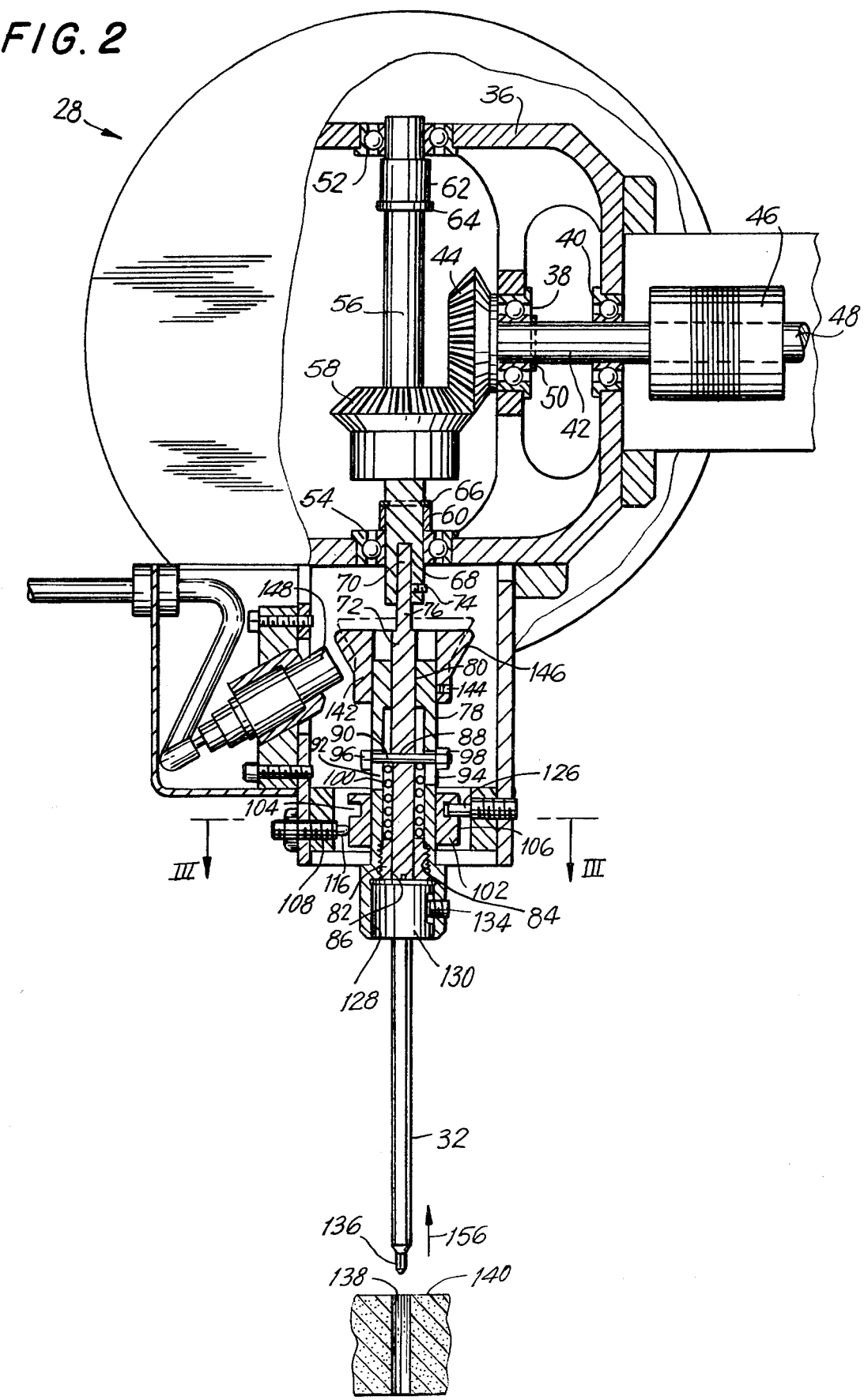
FIG. 2 is a closeup in partial cross section of a control head.

Referring now to FIG. 2, an internal frame 36 in control head 28 bears first and second aligned bearings 38 and 40 guiding and supporting a shaft 42 having a bevel gear 44 at the end thereof. A conventional flexible coupling 46 couples rotation from a shaft 48 of motor 34 (not shown in FIG. 2). A retaining ring 50 helps maintain axial alignment of bevel gear 44.

A further pair of aligned bearings 52 and 54 support a shaft 56 having a bevel gear 58 meshed with bevel gear 44. Spacers 60 and 62 are held in place by retaining rings 64 and 66 respectively and maintain the axial position of shaft 56 and bevel gear 58.

A recess 68 in the lower end of shaft 56 receives a reduced diameter portion 70 of a coupling shaft 72. Reduced diameter portion 70 is secured in recess 68 by any convenient means such as, for example, by a set screw 74. A neck portion 76 of reduced diameter portion 70 extending beyond recess 68 provides an intentional weakened portion for permitting lateral compliance as will be explained hereinafter.

A sleeve 78 includes an upper portion 80 closely fitting the outer surface of coupling shaft 72 but permitting relative axial motion therebetween. A threaded sleeve 82 is threaded into an enlarged opening 84 in the lower end of sleeve 78. A bore 86 slidably supports the extremity of coupling shaft 72.

A crossbore 88 in coupling shaft 72 receives a pin 90 extending therebeyond and passing through slots 92 and 94 in sleeve 78. A head 96 on one end of pin 90 and a nut 98 on the other end thereof maintains pin 90 in place. A coil spring 100 is biased in compression between pin 90 and threaded sleeve 82. Adjustment of threaded sleeve 82 in and out of enlarged opening 84 adjusts the spring tension on coil spring 100. A centering sleeve 102 is slidably disposed on sleeve 78. Centering sleeve 102 includes an annular groove 104 and an external bearing surface 106.

Figure 3:
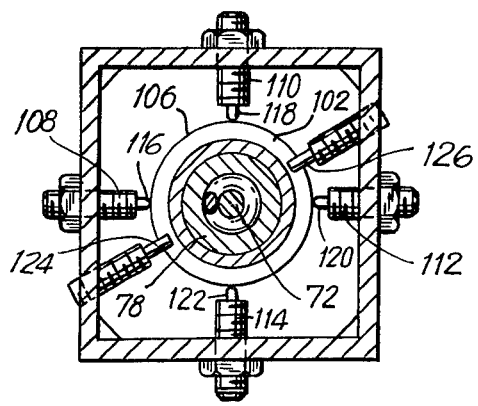
FIG. 3 is a cross section taken along III—III of FIG. 2.

Referring momentarily to FIG. 3, four spring pins 108, 110, 112 and 114 are located in opposed pairs contacting bearing surface 106 and maintaining centering sleeve 102 as well as sleeve 78 and coupling shaft 72 in a normal centered location. Spring pins 108, 110, 112 and 114 are of the type having outwardly spring loaded tips 116, 118, 120 and 122 respectively and, in the absence of lateral force on the assembly, their resiliently urged contact on bearing surface 106 maintain centering sleeve 102 and the elements within in a nominal centered position.

A pair of retaining fingers 124 and 126 are loosely fitted partway into annular groove 104 to resist axial motion of centering sleeve 102. The ends of retaining fingers 124 and 126 stop substantially short of the inner surface of annular groove 104 so that a substantial amount of lateral motion is permitted without contact therebetween.

Returning now to FIG. 2, tool holding cavity 128 receives a collet 130 of a tuning wand 32. A set screw 134 may be employed to secure collet 130 in tool holding cavity 128. Tuning wand 32 may have any conventional tip 136 sized and shaped to fit a mating portion 138 of an element 140 to be tuned. For purposes of illustration, element 140 is illustrated as a powdered iron slug with a rectangular axial hole therein and tip 136 is illustrated as rectangular.

A sensor collar 142 is secured to the upper end of sleeve 78 by any convenient means such as, for example, by a set screw 144. Sensor collar 142 includes an outwardly flaring flange 146. Outwardly flaring flange 146 is coated with a diffuse, or Lambertian, reflecting coating such as, for example, flat white paint.

An optical reflective sensor 148 which may be, for example, an integrated light source and photo diode such as the type HEDS-1000 produced by Hewlett Packard, is disposed with its field of view directed toward outwardly flaring flange 146. Optical reflective sensor 148 is preferably of the type including an integral lens which images the light source and focuses the optical detector on the same spot.

Figure 4:
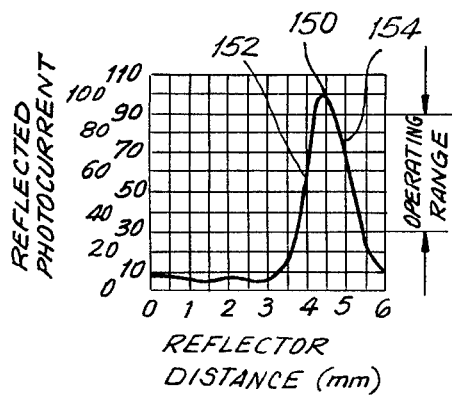
FIG. 4 is a curve showing the relationship between reflector distance and reflective photocurrent which will be employed in the description of the height sensing technique.

Referring now to FIG. 4, there is shown a curve relating the reflected photocurrent in an optical reflective sensor to the distance of the reflector from a datum. It will be noted that a central peak 150 is bounded on each side by substantially linear portions 152 and 154 where the photocurrent decreases or increases smoothly with changing distance. An operating region may be selected from the 90% to the 30% photocurrent region of one of the linear portions such as, for example, linear portion 154. An initial reflector distance of about 4.6 mm establishes a nominal reflected photocurrent of about 90% of the peak. If a threshold device (not shown) is employed to detect the existence of a predetermined level of photocurrent such as, for example, 60% of the peak, then the photocurrent can be employed to measure the movement of outwardly flaring flange 146 away from optical reflective sensor 148.

Returning now to FIG. 2, when tuning wand 132 is lowered so that tip 136 enters mating portion 138 of element 140, when these elements are fully mated, an upward force is applied on tuning wand 132 as indicated by an arrow 156. This tends to resist downward motion of tuning wand 132 with sleeve 78 and sensor collar 142 attached to it. Thus, coupling shaft 72 is enabled to slide downward in upper portion 80 of sleeve 78 and bore 86 in threaded sleeve 82. Relative motion between coupling shaft 72 and parts sliding with respect to it is resisted by coil spring 100. Centering sleeve 102, being restrained from axial motion by retaining fingers 124 and 126, is held in place while sleeve 78 moves upward with respect thereto. When a predetermined distance is attained between optical reflective sensor 148 and outwardly flaring flange 146, sensing circuits external to the illustrated apparatus sense the predetermined reflected photocurrent (see FIG. 4) and halt the downward travel of control head 28.

Figure 5:
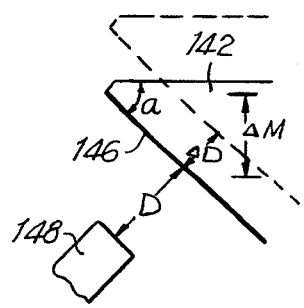
FIG. 5 is a closeup view of an optical reflective sensor and a flange to which reference will be made in describing the invention.

Referring now to FIG. 5, initially outwardly flaring flange 146 of sensor collar 142 is positioned a distance D away from optical reflective sensor 148. When sensor collar 142 is moved axially a distance $\Delta M$ in the manner previously described, outwardly flaring flange 146 moves a distance $\Delta D$ further away from optical reflective sensor 148. If the angle of outwardly flaring flange 146 from the horizontal is equal to $\alpha$, $\Delta D = \Delta M \cos \alpha$. That is, by varying the size of angle $\alpha$, the relationship between $\Delta M$ and $\Delta D$ can be changed so that a greater or lesser change in reflector distance can be employed to achieve the predetermined value of reflected photocurrent (FIG. 4) which is employed to stop the travel of Z-axis actuator 26 (FIG. 1).

Referring again to FIG. 2, neck portion 76 provides a purposely weak region at which coupling shaft 72 may be permitted to deflect in response to transverse forces resulting from minor misalignment between tip 136 and mating portion 138 of element 140. When such lateral forces are produced, the appropriate one or more of tips 116, 118, 120 and 122 of spring pins 108, 110, 112 and 114 is depressed against the outwardly urging spring forces. When the transverse force is removed, neck portion 76 tends to again straighten. This is aided by the opposing forces generated by spring pins 108, 110, 112 and 114.

Figure 6:
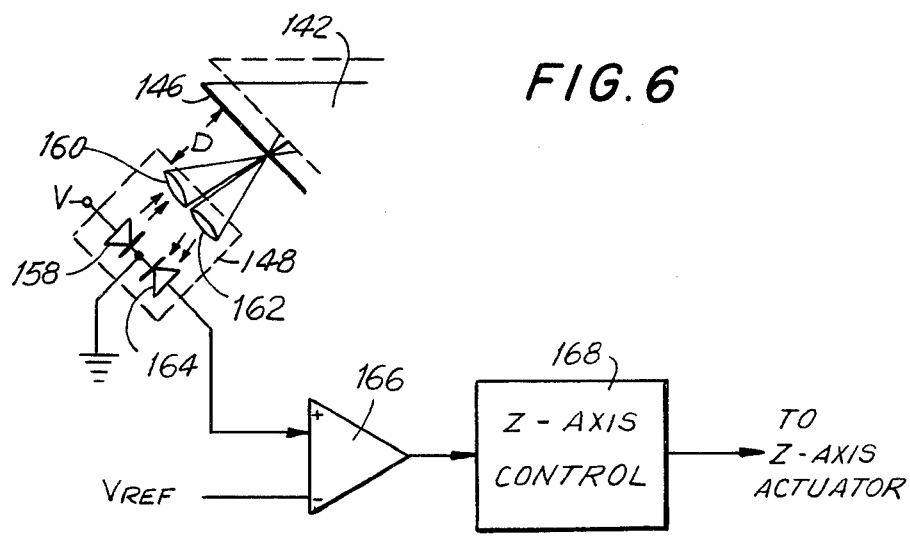
FIG. 6 is a simplified schematic diagram of the manner in which the Z axis actuator is controlled by the height sensor of the present invention.

Referring now to FIG. 6, optical reflective sensor 148 consists of a photo diode 158 whose output is imaged on outwardly flaring flange 146 by a first lens 160. A second lens 162 images substantially the same spot on a photodetector 164. In the geometry shown, it would be clear that the focussed spot and the image thereof can only coincide at one distance D and that greater or lesser distances not only defocus the spot and image, but also cause the light spot and image to move out of coincidence. The combination of defocusing and lack of coincidence produces the photocurrent change with distance shown in FIG. 4.

The photocurrent output of photodetector 164 is applied to a plus input of a comparator 166. A reference voltage $V_{REF}$ is applied to the minus output of comparator 166. When the photocurrent decreases to a value lower than the reference voltage $V_{REF}$, the output of comparator 166 inverts and this signal, applied to a Z-axis control 168 of a conventional type, causes the Z-axis control 168 to command the Z-axis actuator 26 to stop its descent.

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

I claim:

1. A robotic device having position control in at least one axis, comprising:

a control head;

an affector extending from said control head parallel to said axis;

means for permitting rotation of said affector about said axis;

means for permitting displacement of said affector along said axis with respect to said control head in response to contact between said affector and an external object;

a conical surface movable with said affector symmetrically disposed about said axis;

a diffusely reflective surface on said conical surface;

said conical surface being disposed at an angle to said axis; and an optical reflective sensor stationarily disposed in said control head, said optical reflective sensor being effective to focus a spot of light on said surface and to detect said spot of light to produce a signal in response there-to, said signal being variable with a distance between said optical reflective sensor and said surface when said affector is displaced along said axis by contact with an external object whereby said signal is related to said displacement along said axis and to a function of said angle.

2. A robotic device according to claim 1, further comprising means for stopping motion of said affector along said axis when said signal reaches a predetermined value.

3. A method of controlling a height of a robotic member with respect to a workpiece, comprising:

moving an affector on said robotic member along an axis toward said workpiece;

permitting rotation of said affector;

permitting said affector to displace along said axis with respect to said robotic member in response to contact between said affector and said workpiece;

focussing a spot of light on a diffusely reflective conical surface movable with said affector symmetrically disposed at an angle with respect to said axis;

detecting said spot of light to produce a signal;

displacing said conical surface with displacement of said affector to produce a substantially smooth change in said signal in response to a change in displacement of said affector; and stopping motion of said robotic member along said axis when said signal attains a predetermined value.

* * * * *